H. B. LAYMAN.
CONNECTING ROD.
APPLICATION FILED MAR. 24, 1916.
1,387,277.
Patented Aug. 9, 1921.
6 SHEETS—SHEET 1.
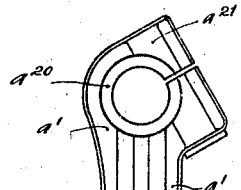
Fig. 1.
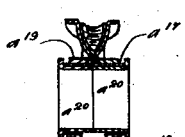
Fig. 2.
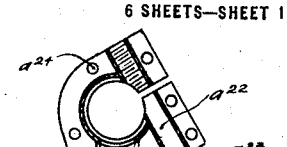
Fig. 4.
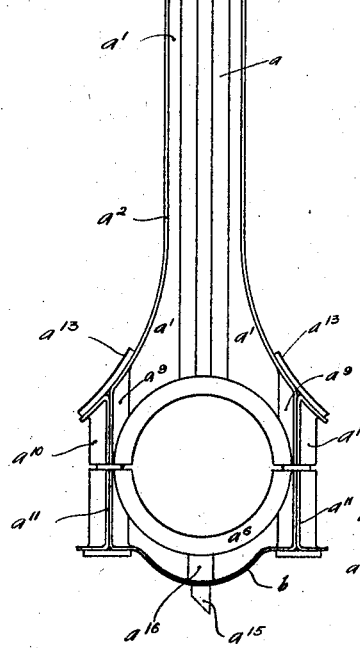
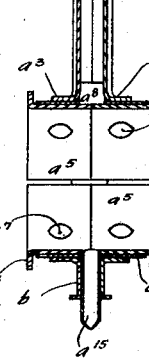
Fig. 3.
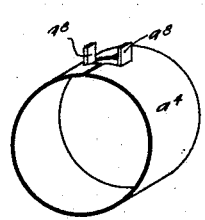
Fig. 5.
WITNESSES:
H. A. Soules
Ronald F. Knight
INVENTOR
Hebron B. Layman.
BY
W. W. Canfield
ATTORNEY H. B. LAYMAN.
CONNECTING ROD.
APPLICATION FILED MAR. 24, 1916.
1,387,277.
Patented Aug. 9, 1921.
6 SHEETS—SHEET 2.
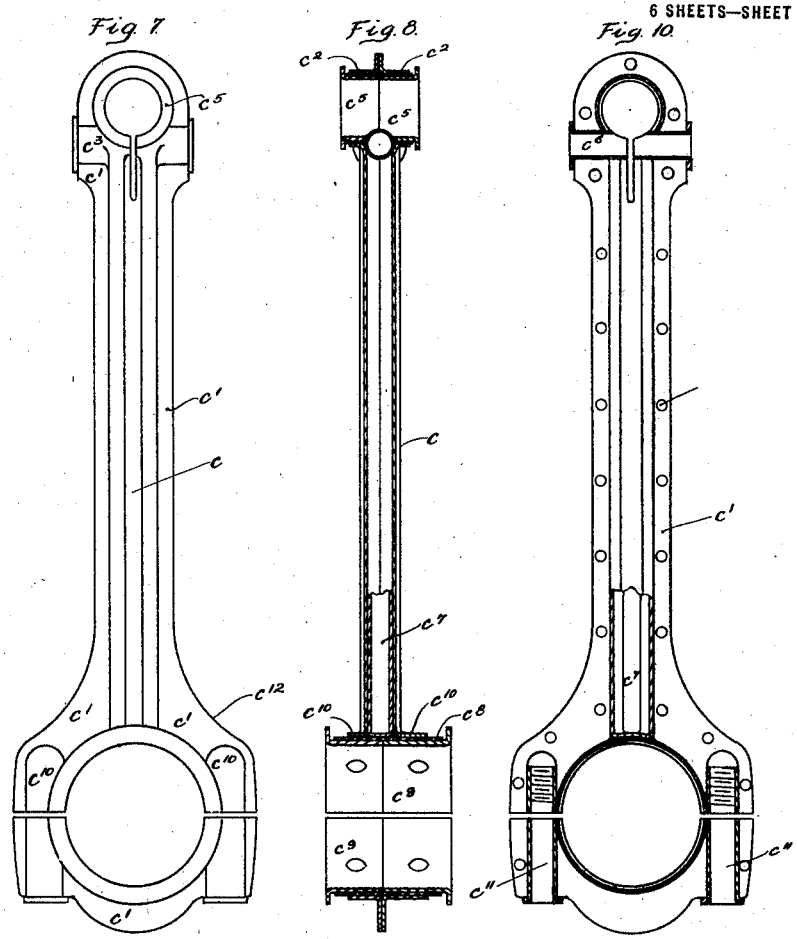
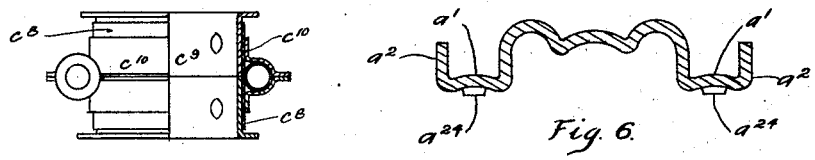

H. B. LAYMAN.
CONNECTING ROD.
APPLICATION FILED MAR. 24, 1916.

1,387,277.

Patented Aug. 9, 1921.
6 SHEETS—SHEET 3.

WITNESSES:
H. A. Soulis
Ronald F. Knight

INVENTOR
Hebron B. Layman

BY
W. W. Canfield
ATTORNEY

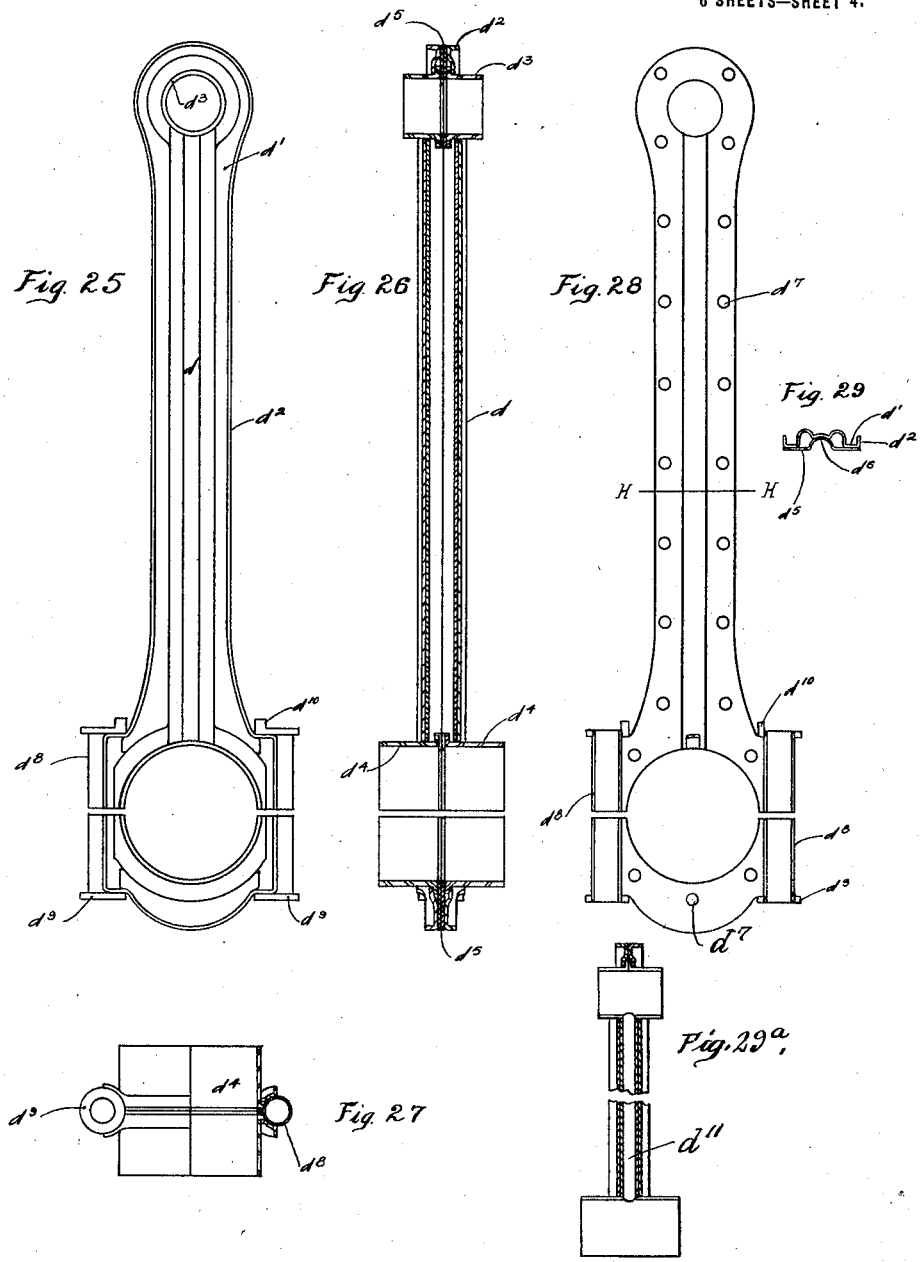

H. B. LAYMAN.
CONNECTING ROD.
APPLICATION FILED MAR. 24, 1916.

1,387,277.

Patented Aug. 9, 1921.
6 SHEETS—SHEET 5.

WITNESSES:

INVENTOR
Hebron B. Layman.
BY
W. W. Canfield.
ATTORNEY

H. B. LAYMAN.
CONNECTING ROD.
APPLICATION FILED MAR. 24, 1916.
1,387,277.
Patented Aug. 9, 1921.
6 SHEETS—SHEET 6.
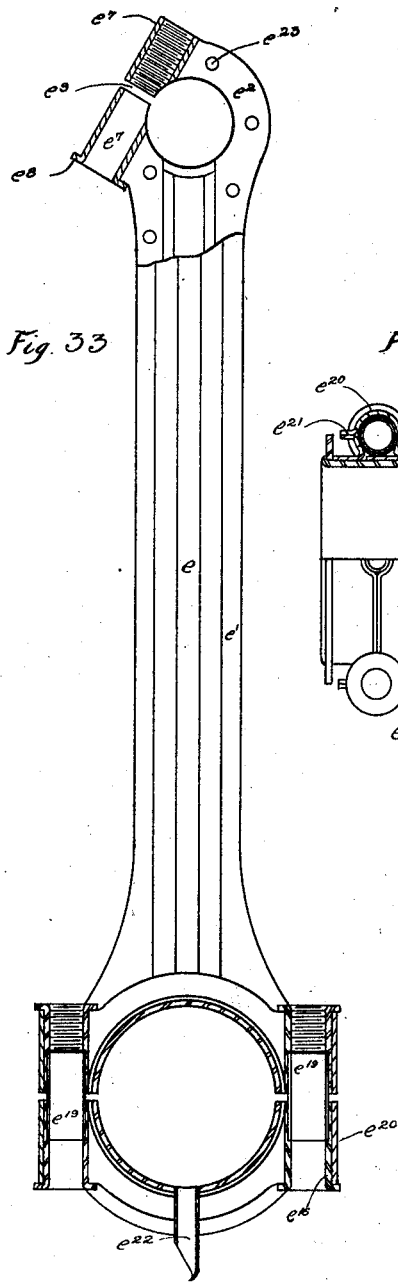
Fig. 33.
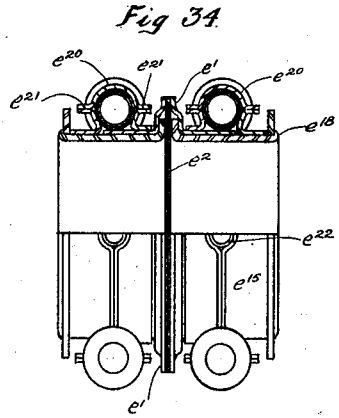
Fig. 34.
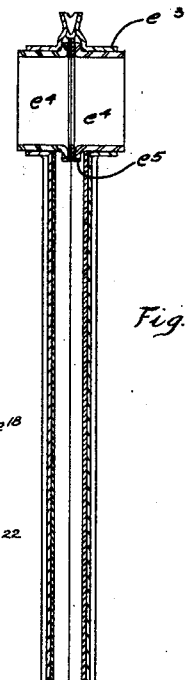
Fig. 35.
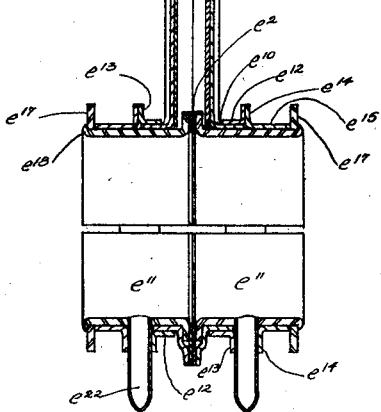
WITNESSES:
H. C. Soulis.
Ronald F. Knight
INVENTOR
Hebron B. Layman.
BY
W. W. Canfield.
ATTORNEY

UNITED STATES PATENT OFFICE.

HEBRON B. LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,387,277.  Specification of Letters Patent.  Patented Aug. 9, 1921.

Application filed March 24, 1916. Serial No. 86,361.

*To all whom it may concern:*

Be it known that I, HEBRON B. LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, particularly connecting rods built up of a number of parts, and more particularly, but not necessarily, to sheet metal connecting rods, and the objects hereof, are the provision of improved means for securing a gudgeon pin or piston pin in place, means for decreasing the height of the rod in the region of the bolt bosses at the crank end, improved means for doweling the cap to the rod, and improved bolt boss construction by means of which the width of the rod, as measured across the bolt bosses, is materially decreased. Another object of this invention is the provision of means whereby the cap may be secured to the rod at four or more points. Other important objects of this invention are the provision of means for reinforcing the shank portion of the rod against shear, as well as against compression, and more especially increasing the ability of the rod to withstand tension in the region of the junction of the bosses and the shank. Other objects will appear in the specification and in the appended claims.

The invention is fully disclosed in the following specification, of which the drawings form a part, and in which like reference characters designate similar parts.

By way of example, I show in—

Figure 1 a side elevation of a pressed metal connecting rod, which is provided with a detachable cap;

Fig. 2 is a sectional elevation on the center line of Fig. 1;

Fig. 3 is a bottom view of the rod, one-half of which shows the plan of the cap, the other half showing the abutting face of the rod at its junction with the cap;

Fig. 4 is an elevation of the rod in Fig. 1, with one-half of the rod removed, the bushings all being shown in section;

Fig. 5 is a perspective of the crank end liner bushing of Fig. 4, and is more particularly referred to hereafter;

Fig. 6 is an enlarged cross section of the shank portion of the body-section of the rod of Fig. 4;

Fig. 7, like Fig. 1, is an elevation of a pressed metal connecting rod having a detachable cap;

Fig. 8 is a sectional elevation along the center line of Fig. 7;

Fig. 9 is a bottom view of the rod in Fig. 7, and bears the relation that Fig. 3 does to Fig. 1;

Fig. 10 is an elevation of the rod in Fig. 7 with one-half removed, the bushings being shown in cross section, and the interior shank reinforcing member shown partly in section and partly broken away;

Figs. 11 to 24 inclusive show modifications of cross sections of the shank portion of the rod.

Fig. 25 is a side elevation of a connecting rod embodying modifications hereafter described in detail.

Fig. 26 is a cross section in elevation along a vertical center line of the rod in Fig. 25.

Fig. 27 is a bottom view of the rod in Fig. 25 and half of this shows the plan of the cap and the other half shows the abutting face of the rod at its junction with the cap.

Fig. 28 is the side elevation of the rod in Fig. 25 with half of the rod removed.

Fig. 29 is a cross section along the line H—H of Fig. 28.

Figure 11:
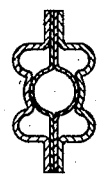
Figure 12:
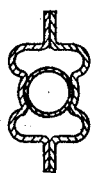
Figure 13:
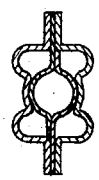
Figure 14:
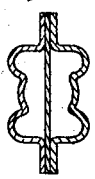
Figure 15:
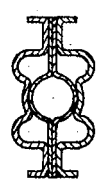
Figure 16:
Figure 17:
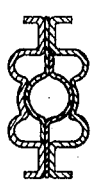
Figure 18:
Figure 19:
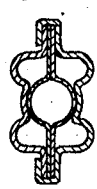
Figure 20:
Figure 21:
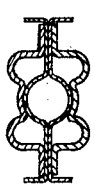
Figure 22:

Fig. 29$^a$ is a longitudinal sectional view of the rod, a cross section of which is shown in Figs. 15 and 29.

Figure 30:
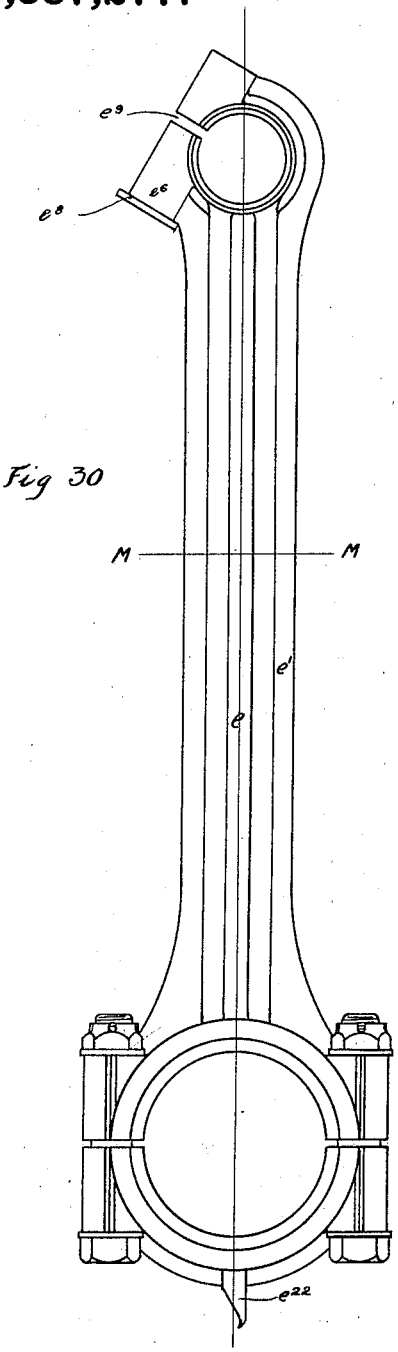

Fig. 30 is a side elevation of a rod showing another modification of the invention.

Figure 31:
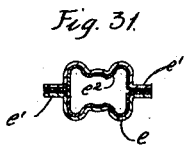

Fig. 31 is a cross section along the line M—M of Fig. 30.

Figure 32:
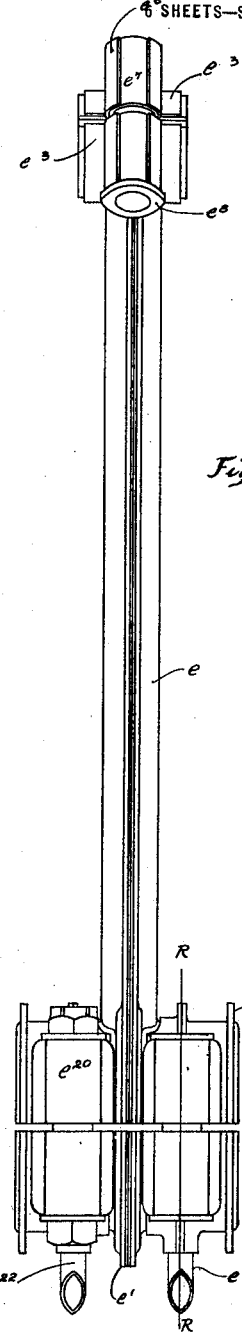

Fig. 32 is a front elevation of the rod in Fig. 30 but at a right angle thereto.

Fig. 33 is a side elevation of the rod in Fig. 30 and similar thereto but the piston end of the rod is shown partly broken away and partly in section and the crank end of the rod is shown on line R—R of Fig. 32.

Fig. 34 is a bottom view of the rod in Figs. 30, 32 and 33. Half of this view shows the bottom of the cap, the other half the abutting face of the rod at its junction with the cap.

Fig. 35 is a section along the line T—T of Fig. 30.

In Figs. 1, 2, 3 and 4, by way of example,

I show a rod composed of two longitudinal parts $a$, provided with extending flanges $a^1$ and supplementary flanges $a^2$, which, when the two longitudinal parts $a$ which compose the rod are assembled together, form a T-shaped flange extending around the rod.

The two body-sections or longitudinal parts are provided with bosses $a^3$ at the larger end, and these together form a crank pin boss, which is fitted with a liner bushing $a^4$ which unites the body-sections. Within this liner bushing are fitted flanged bushings $a^5$, provided with flanges $a^6$, which prevent the crank end from spreading when in service. These bushings also have holes or interstices $a^7$ for locking the Babbitt metal in place, for it is presumed that in this particular rod the bearing metal will be cast directly into the rod in the usual manner.

The liner bushing $a^4$ is here shown as a butted ferrule, having extended lips $a^8$ which connect with the body-sections $a$, and which when the rod is finally welded or brazed together, securely unite the crank end with the shank portion, and reinforce it against rupture through tension.

The crank pin end of the rod is here shown provided with bolt bosses $a^9$, as a means for securing the cap $b$ to the rod $a$. One-fourth of the circumference of each bolt boss is formed in each of the two body-sections, and the other half of the bolt boss is formed by an additional member, $a^{10}$ which is shown provided with flange $a^{11}$ to unite with the flange $a^2$ of the body-section and forms a reinforcing rib extending along the bolt boss. This flange along this bolt boss serves four purposes; it reinforces the bolt boss against the compression of the bolts, it prevents "weaving" or twisting of the rod in the region of the bolt boss, it materially improves the appearance of the rod, and it also provides a means for spot welding the bolt boss cap $a^{10}$ to the body-sections.

The bolt bosses which, as before stated, are formed by and between the parts composing the rod and the additional member $a^{10}$, are fitted with lining bushings $a^{12}$, which are welded, brazed or secured in place. These bushings are shown threaded to receive studs or cap-screws and as a means of further securing them to the rod, they are provided with flanges $a^{13}$, which are united in a desirable manner to the flanges $a^2$ of the body-sections.

The liner bushings $a^{12}$ are shown bored out to receive a thimble or ferrule $a^{14}$, which serves as alining means or dowel for the cap $b$. In practice the inner diameter of these ferrules is slightly larger than the stud or bolt to be used, and are made a snug fit in both the rod and cap. Their location, diameter and length insure the cap being accurately located, which would not always be the case if I relied for alinement upon the studs or bolts.

The cap $b$ I have shown as though formed in one with the rod and cut therefrom, but it is obviously possible to form the cap apart from the rod and later unite them. Between the body-sections $a$ at the bottom of the cap, I show an oil scoop $a^{15}$, fitted into a boss $a^{16}$, formed between the two parts composing the cap. This oil scoop is rigidly secured in place, and when the rod dips into the oil trough enough oil is splashed through the scoop to lubricate the bearing, which in this instance may be cast in place in the crank end of the rod.

The small end or piston end of the rod is shown with a lining bushing $a^{17}$ which like the crank end bushing, is fitted with extending wings $a^{18}$, which firmly unite and reinforce the piston pin bosses $a^{19}$ to the shank portion of the rod. Flanged bushings $a^{20}$ are shown within the liner bushing.

Between the two body-sections at one side of the piston pin boss and cutting into it, is a piston-pin pinch-bolt boss $a^{21}$, which is shown sawed in two, approximately on the center line of the piston pin boss $a^{19}$. This pinch-bolt boss $a^{21}$ is fitted with a lining bushing $a^{22}$, which is threaded to receive the stud or cap-screw, and is provided with a flange or washer $a^{23}$ to seat the head of the capscrew or the nut.

The rod body-sections $a$ are shown provided with a series of projections $a^{24}$, which, in practice, are raised above the face of the body-sections, approximately .030". These projections are used in welding the two body-sections together under the well known projection system of electric welding.

Fig. 6 as previously stated, shows an enlarged cross section along line M—M of Fig. 4. Here again are seen the flanges $a^1$ and the supplementary flanges $a^2$, and the projections $a^{24}$. It will be observed that the flange $a^1$ is shown curved in cross section, thus forming a wall around the welding projection $a^{24}$; the purpose of this depression is to form a cavity into which the "flash", or molten metal which is squeezed out in the process of welding, may flow. Without this provision the two body-sections $a$ when welded might be kept slightly apart by the "flash". When this occurs, the fine accuracies necessary in the location of the bolt bosses and especially the liner bushings, are upset. Further, as I prefer to braze the rod by immersion in spelter, after the rod has been completely assembled and first spot-welded together, unless the two body-sections $a$ closely join throughout the length of the flanges $a^1$, the spelter will fail to unite the pieces. In short, molten spelter will not fill a wide crevice such as may be caused by the "flash" from a welding projection, so I have provided the flanges $a^1$ with channels or wells around the projections $a^{24}$, as described, into which the flash is forced.

In Figs. 7, 8, 9 and 10 I show by way of modification a connecting rod formed of two body-sections $c$ having flanges $c^1$ which abut. Between these body-sections at right angles to the axis of the rod and beneath the piston pin boss $c^2$ I show the pinch bolt boss $c^3$. Here the shank of the rod is shown with a sawcut to allow the piston pin boss and the flanged bushings $c^5$ to contract under the tension of the pinch bolt, which is not shown. It will be observed that the pinch bolt liner bushing $c^6$ makes contact with the body sections where the shank connects with the bolt boss $c^3$ and in this manner this liner bushing serves the purpose of the wings $a^{18}$ of the liner bushing in the rod in Fig. 4.

Within the hollow shank of the rod in Figs. 8 and 10, there is a shank reinforcing member $c^7$. This member is shown broken away, but normally would extend throughout the length of the shank. This shank reinforcement connects with the liner bushing $c^8$ of the crank end of the rod, and when the rod is brazed or welded together, this makes a necessary and satisfactory union of the shank and the crank pin boss. It should be observed, as shown in these figures, that the crank pin boss is composed of the liner bushing $c^8$, the flanged bushings $c^9$, and the bosses $c^{10}$ which are formed of the body-sections.

The bolt bosses $c^{10}$ of the crank end are shown with closed ends and provided with threaded ferrules $c^{11}$. With this construction, as distinguished from that shown in my application now pending before the Patent Office, No. 24,481 and filed April 27th, 1915, and of which this is an improvement, the crank end of the rod is reduced in height as measured along the axis of the bolt bosses. This is in the region marked $c^{12}$ in Fig. 7.

Figure 23:
Figure 24:
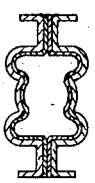

Figs. 11 to 24 inclusive are modifications of the form of the shank reinforcing means, any one of which I may use. More particularly Fig. 23 is a cross section of the shank shown in Figs. 7, 8 and 9.

The Fig. 15 shows a cross section which is used in the rod of Figs. 25 to 29 inclusive, and 29ª.

Where these shanks are provided with an interior or reinforcing member which is tubular in cross section, I may use this tube to carry oil from the crank end of the rod to the piston end.

In Figs. 25 to 29 inclusive is shown a connecting rod formed of two similar body sections $d$ having flanges $d^1$ which abut and these flanges in turn provided with supplementary flanges $d^2$, which together form a T-shaped flange extending around the rod. In the rods of Figs. 1 to 7 the body-sections are shown with bosses drawn integrally to form the crank end and piston pin bosses.

In the Figs. 25 to 29 the body-sections are shown with crank pin and piston pin bosses formed from flanged bushings $d^3$ and $d^4$ respectively. The flanges of these bushings are shown abutting on the center line of the rod. These bushings are secured to the body-sections in any desired manner, but preferably by brazing after spot-welding to secure them in place.

In Figs. 26 to 29 inclusive are shown reinforcing members $d^5$ which extend the length of the rod. These pieces are formed from sheet metal and provided with corrugations $d^6$, which extend the length of the shaft portion. These pieces are all formed similar to that of the rod and are secured to the rod by welding preferably through the use of the projection system. They are also provided with projections $d^7$ which serve to secure reinforcing pieces together after they have been secured each to its rod body-section.

The rod is shown provided with ferrules $d^8$ which have round washers $d^9$ on one end and a lipped washer $d^{10}$ at the other end. These washers are secured in place by curling over the ends of the ferrules $d^8$ when first assembled. It is to be observed in Fig. 27 that the body-sections are formed with channels and that the two together form a semi-cylindrical recess which receives the ferrules $d^8$ and to which the ferrules are welded and brazed.

Fig. 29ª is a longitudinal sectional view of the rod, a cross sectional view of which is shown in Figs. 15 and 29, and is intended to illustrate the use of the central tube $d^{11}$ as an oil duct or passage for conveying oil from the crank pin bearing to the piston pin bearing.

In Figs. 30 to 35 inclusive the rod is shown formed of two similar body-sections $e$ having flanges $e^1$ which abut in a plane at right angles to the crank axis. These two flanges form a reinforcing rib which extends along the shank and around the crank shaft and piston pin bosses. The principal function of this flange is to provide an adequate means for securing the two parts together and also to form a reinforcement around the crank shaft boss, such as will prevent the boss from spreading out of round. This flange is particularly well shown in Fig. 34.

Within the two body-sections and of similar conformation are two shank portion reinforcing members $e^2$. These are formed from sheet metal and are secured to each body-section. These are welded to the body-sections and then welded together by means of projections $e^{23}$ of Fig. 33.

This rod is shown with the body-sections having bosses $e^3$ formed at one end and together they compose the piston pin boss. This boss is provided with interior reinforcing members $e^4$ having flanges $e^5$ which abut at the center of the rod. Between these two flanges are secured the two reinforcing members $e^2$. This piston pin boss is provided with a bolt boss $e^6$ at an angle thereto and cutting thereinto. This boss in turn has an interior reinforcement $e^7$ which has a flange $e^8$ at one end to seat the head of the cap screw or the nut of the stud, to receive which the ferrule is shown with half its length threaded. This boss $e^6$ is cut in two midway its length. This is to allow the piston pin boss to be pinched around the piston pin, which is not here shown.

With reference to the crank end of the rod in Fig. 35 it will be observed that the body-sections are provided with integral crank pin bosses $e^{10}$ and secured within these are reinforcing members $e^{11}$. These members are drawn flanged ferrules which abutt against the reinforcing members $e^2$ at the center of the rod. Fitted on and encircling the boss $e^{10}$ is a member $e^{12}$ which has an abutting flange $e^{13}$ which adjoins the flange $e^{14}$ of another and substantially similar member $e^{15}$. By and between the abutting flanges $e^{13}$ and $e^{14}$ are formed recesses into which are fitted ferrules, $e^{16}$ in Fig. 33. By this means the cap is secured in place. It will be noticed that the member $e^{15}$ does not rest on the integral boss $e^{10}$ of the body-sections but upon the reinforcing liner bushings $e^{11}$. In actual practice little is gained in strength by extending the boss $e^{10}$ for the ful width of the crank pin boss as designated by the entire length of the two bushings $e^{11}$ and to draw the metal to form such a deep boss requires additional operations which I find in practical experience can be dispensed with. But to do this the crank end boss must be provided with radial flanges to prevent it from spreading and such flanges are shown composed of the two elements $e^{12}$ and $e^{14}$. Additional flanges are provided by the rings $e^{17}$ shown at the ends of the crank pin boss. These flanges are loose rings which are the last elements to be assembled on the boss. After these, the ends of the bushings $e^{11}$ are spread over as shown at $e^{18}$ to clench these rings in place and as a further means of securing together the body-sections.

In Figs. 33 and 34 the ferrules $e^{16}$ which are shown in the bolt bosses formed by and between the abutting parts on the crank boss, are provided with a lining sleeve $e^{19}$ and a threaded end portion. These have been more particularly referred to in relation to Figs. 1 to 4 inclusive. It will be observed that the bolt bosses are provided with cap members $e^{20}$ having flanges $e^{21}$ which abutt with flanges $e^{13}$ and $e^{14}$. This cap forms a closure for the bolt boss and gives the rod a symmetrical and pleasing finish besides very materially strengthening the bolt boss against the tension of the bolt.

$e^{22}$ are tubes which are secured in bosses formed by and between the flanges $e^{13}$ and $e^{14}$. These tubes are secured by welding or brazing preferably. The purpose of these tubes is to act as oil scoops when the rod dips into the crank pit of the engine.

Having fully described my invention what I claim as new and desire to secure by Letters Patent, is:

1. A sheet metal connecting rod having portions of one end portion bent inwardly to receive a portion of a cap securing means, and exteriorly applied elements secured to the end of the rod and adjacent the inwardly bent portions to coöperate therewith to receive the said cap securing means.

2. A connecting rod having an end portion formed from a plurality of sheet metal parts, and separate means permanently affixed exteriorly thereto adapted to receive an attaching means for a cap.

3. A sheet metal connecting rod having a formed end portion provided with exteriorly applied means permanently affixed to the formed end portion adapted to receive bolts or studs to secure a cap to the rod.

4. A connecting rod having an end portion formed from a plurality of parts, and means affixed exteriorly thereto and therebetween for securing a cap to the rod.

5. A connecting rod having an end portion provided with a bearing adapted to be separated to form a cap, and means affixed exteriorly to the rod for securing the cap thereto.

6. A sheet metal connecting rod having an end formed from a plurality of parts, which together form a semi-circular recess, adapted to receive a tubular bolt receiver.

7. A connecting rod having in one end portion a boss having an aperture to receive means to secure a cap in place, said boss being formed partly by a recessed wall of the rod and partly by an additional element.

8. A connecting rod having in one end portion a boss having an aperture to receive means to secure a cap in place, said boss being formed by a recessed wall of the rod and an additional element applied exteriorly to the rod.

9. A connecting rod provided with a bearing and adapted to be separated through the bearing to form a cap, said rod having a boss portion provided with an aperture to receive means to secure the cap in place, said apertured boss portion being formed partly by the rod and partly by an additional element.

10. A connecting rod having a shank formed from sheet metal parts and having a reinforcing piece of sheet metal secured to and between the said parts, in the region of the shank portion of the rod, the said parts being provided with electric welding projections.

11. A connecting rod having a shank formed from sheet metal parts and having a reinforcing piece of sheet metal secured to and between the said parts, the said parts being provided with electric welding projections, and said reinforcing pieces being provided with electric welding projections.

12. A connecting rod having a shank formed from sheet metal parts and having a reinforcing piece of sheet metal secured to and between the said parts, said reinforcing pieces being provided with electric welding projections.

In testimony that I claim the foregoing as my invention I have signed my name in presence of the subscribing witnesses this 20th day of March, 1916.

HEBRON B. LAYMAN.

Witnesses:
M. C. MEYER,
H. C. SOULIS.